R. D. SPEARS.
ROW MARKING ATTACHMENT FOR CORN PLANTERS.
APPLICATION FILED MAR. 18, 1915.
1,152,345.
Patented Aug. 31, 1915.
2 SHEETS—SHEET 2.
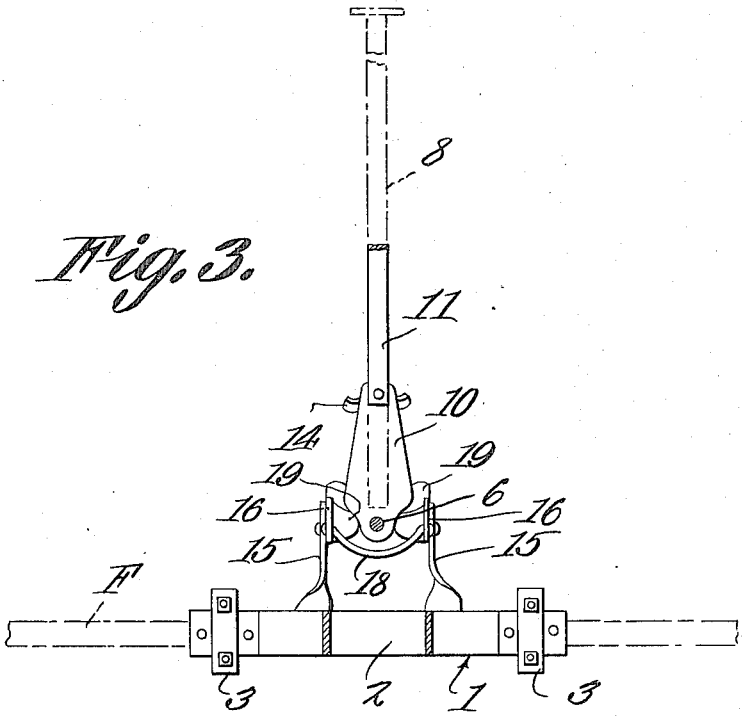
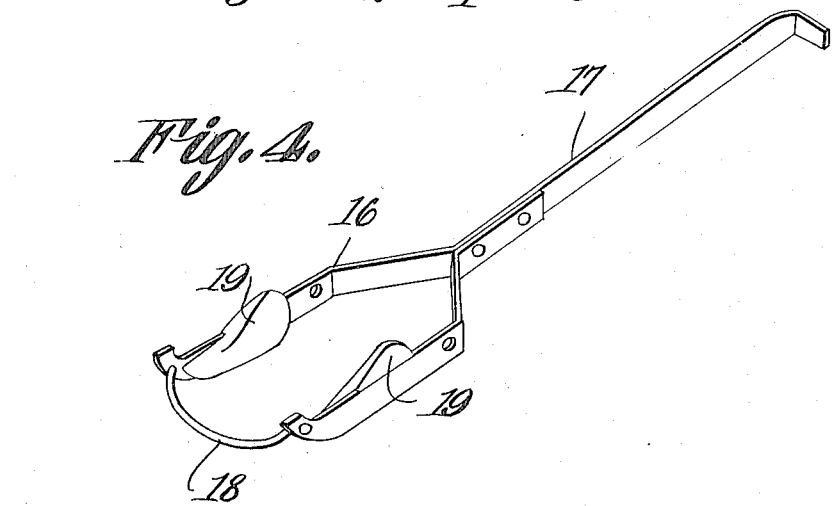
R. D. Spears
Inventor,
by C. A. Snow & Co.
Attorneys.
Witnesses

UNITED STATES PATENT OFFICE.

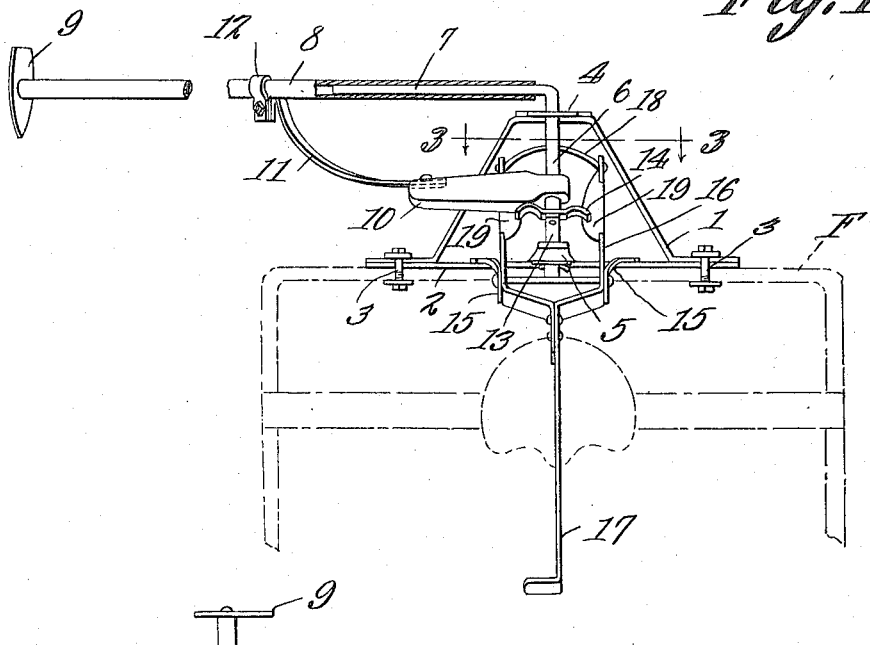
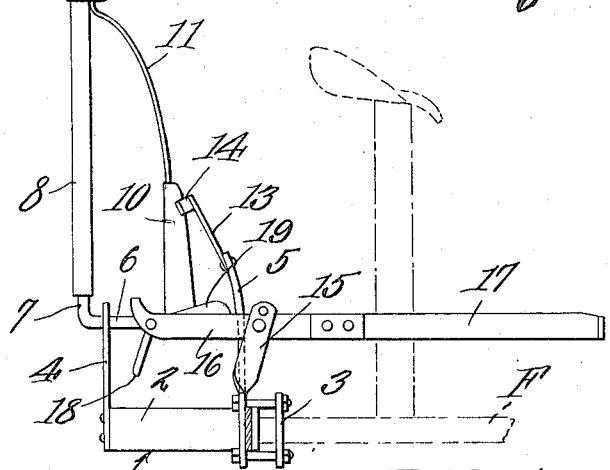

RICHARD DWIGHT SPEARS, OF HOMEWOOD, KANSAS.

ROW-MARKING ATTACHMENT FOR CORN-PLANTERS.

1,152,345.  Specification of Letters Patent.  Patented Aug. 31, 1915.

Application filed March 18, 1915. Serial No. 15,306.

*To all whom it may concern:*

Be it known that I, RICHARD DWIGHT SPEARS, a citizen of the United States, residing at Homewood, in the county of Franklin and State of Kansas, have invented a new and useful Row-Marking Attachment for Corn-Planters, of which the following is a specification.

This invention relates to a row marking attachment for corn planters, one of its objects being to provide a device of this character which may be applied readily to the frame of a corn planter and which has foot operated means whereby the marker can be quickly lifted out of active position whether extended from the right or from the left of the machine.

Another object is to provide means for automatically engaging the marker when raised out of active position, thus to hold it until the user is ready to shift it to either side of the machine.

A further object is to provide a marker of this type which is simple, compact and durable and which can be applied readily without requiring the services of a skilled mechanic.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the row marker, a portion thereof being broken away, the adjacent part of the planter frame being indicated by dotted lines. Fig. 2 is a side elevation of the structure shown in Fig. 1, the marker being shown out of active position. Fig. 3 is a section on line 3—3 Fig. 1. Fig. 4 is a perspective view of the foot lever.

Referring to the figures by characters of reference 1 designates a frame preferably provided with rearwardly converging sides, the said frame being provided with a separate front strip 2 the ends of which are secured in any suitable manner to the sides 1. Clips 3 are provided for securing the frame 1 to the rear portion of the frame F of a cultivator. Extending upwardly from the rear portion of the frame 1 is a bracket 4 and another bracket 5 is extended upwardly from the front portion of the frame. Journaled in these brackets 4 and 5 is a shaft 6 the rear portion of which is provided with a radial arm 7 on which is mounted a tubular extension 8 of any desired length, this extension being provided at its free end with a marker 9. Secured to the shaft 6 at a point between the brackets 4 and 5 is a holding arm 10 from which extends a brace 11 provided at its outer end with a clamping collar 12 engaging the tubular extension 8, thus to hold said extension 8 against movement relative to the arm 7. By loosening the collar 12, however, the extension 8 can be moved longitudinally within the collar and along the arm 7, thus to bring the marker 9 to any desired distance from the shaft 6.

Extending upwardly and rearwardly from the bracket 5 is a spring arm 13 provided, at its upper end, with oppositely extending curved fingers 14 coöperating to form a yieldingly supported clip. These fingers normally extend into the path of the holding arm 10 so that, when the shaft 6 is rotated to bring the arm 7 and its extension 8 to substantially vertical positions, the holding arm 10 will be brought into engagement with the clip made up of the fingers 14 and will thus be held in upstanding position.

Extending from the front strip 2 of the frame 1 are spaced brackets 15 between which is fulcrumed the forked rear end 16 of a foot lever 17. The free ends of the fork 16 are connected by a yoke 18 depending therefrom and the sides of the forked portion 16 are formed with cam faces 19 constituting deflecting means. The yoke 18 is extended under the shaft 6 and the holding arm 10 is adapted to extend over one or the other of the cam faces 19 when the marker 9 is in use.

It is to be understood that the attachment constituting the present invention can be readily secured to the rear end of a planter frame F by means of ordinary clips 3. When the marker is not in use the arm 10 is in engagement with the strip clip 14 so that arm 10 and its extension 8 will thus extend substantially vertically. When it is desired to use the marker at a point beyond the right side of the frame F, the operator pushes the arm 10 to the right so that it will be forced out of engagement with its holding means 14 whereupon the marker 9 will drop to the ground. Adjustment of the marker toward or from the shaft 6 can be effected as heretofore described. Whenever it is desired to lift the marker 9 out of active position, it is merely necessary to press downwardly on the forward end of lever 17. This will cause the cam face 19 which is under the arm 10 to push upwardly on said arm and rotate the shaft 6, the arm 10 being swung against one of the fingers 14 and finally becoming seated between said fingers where it will be held, thus supporting arm 7 and its extension 8 in upstanding position. As soon as the foot lever 17 is released it will gravitate back to its normal position. The yoke 18 acts as a stop for limiting the downward movement of the front end of lever 17, the said yoke, during such movement, being brought against the shaft 6.

What is claimed is:—

A marking attachment for planters, including a frame, means for attaching the same to the frame of a planter, a shaft journaled on said frame of the attachment, a radial arm revoluble with the shaft, a marking element carried by said arm, a holding arm revoluble with the shaft, a forked lever journaled on the frame of the attachment, said shaft being extended between the sides of the forked portion of the lever, said sides having cam faces either of which is adapted to engage the holding arm to elevate said arm and the marking element, yieldable means for engagement by the holding arm to secure the marking element in elevated position, and a yoke connecting the terminals of the forked portion of the lever and coöperating with the shaft to limit the movement of the lever in one direction.

In testimony that I claim the foregoing as my own, I have hereto affixed my signature in the presence of two witnesses.

RICHARD DWIGHT SPEARS.

Witnesses:
 E. E. ANDERSON,
 G. A. McINTOSH.

Copies of this patent may be obtained for five cents each, by addressing the "Commissioner of Patents, Washington, D. C."